US008653351B2

(12) United States Patent
Skillings

(10) Patent No.: US 8,653,351 B2
(45) Date of Patent: Feb. 18, 2014

(54) SYSTEMS FOR COMBINING INPUTS FROM ELECTRONIC MUSICAL INSTRUMENTS AND DEVICES

(75) Inventor: Steve Skillings, Whitinsville, MA (US)

(73) Assignee: JamHub Corporation, Whitinsville, MA (US)

(*) Notice: Subject to any disclaimer, the term of this patent is extended or adjusted under 35 U.S.C. 154(b) by 0 days.

(21) Appl. No.: 13/347,314

(22) Filed: Jan. 10, 2012

(65) Prior Publication Data

US 2012/0103172 A1 May 3, 2012

Related U.S. Application Data

(63) Continuation of application No. 12/466,311, filed on May 14, 2009, now Pat. No. 8,119,900.

(60) Provisional application No. 61/053,391, filed on May 15, 2008.

(51) Int. Cl.
*G01P 3/00* (2006.01)

(52) U.S. Cl.
USPC .................................. 84/615; 84/626; 84/633

(58) Field of Classification Search
USPC ............................................................. 84/615
See application file for complete search history.

(56) References Cited

U.S. PATENT DOCUMENTS

| | | | | |
|---|---|---|---|---|
| 5,774,567 | A * | 6/1998 | Heyl | 381/119 |
| 5,896,459 | A | 4/1999 | Williams | |
| 6,374,148 | B1 * | 4/2002 | Dharmarajan et al. | 700/94 |
| 6,689,947 | B2 | 2/2004 | Ludwig | |
| 6,782,108 | B2 * | 8/2004 | Shibata | 381/119 |
| 6,795,560 | B2 | 9/2004 | Hamamatsu | |
| 6,839,441 | B1 | 1/2005 | Powers et al. | |
| 8,367,923 | B2 * | 2/2013 | Humphrey | 84/625 |
| 8,385,814 | B2 * | 2/2013 | Sanders et al. | 455/3.06 |
| 2002/0025051 | A1 | 2/2002 | Kohno et al. | |

(Continued)

FOREIGN PATENT DOCUMENTS

| | | |
|---|---|---|
| CN | 1784085 | 6/2006 |
| EP | 1 434 372 | 6/2004 |

(Continued)

OTHER PUBLICATIONS

*Extended European Search Report*, European Application No. 09747619.6, mailed Nov. 3, 2001 (7 pages).

(Continued)

*Primary Examiner* — Christopher Uhlir
(74) *Attorney, Agent, or Firm* — Occhiuti & Rohlicek LLP

(57) ABSTRACT

An apparatus for combining input signals produced by a plurality of electric musical devices includes a plurality of audio buses and a plurality of segments. Each segment includes input circuitry configured to receive at least one input signal from at least one electric musical device and to deliver the at least one input signal to one of the plurality of audio buses; a plurality of variable adjustment devices each associated with a corresponding one of the audio buses and each configured to change at least one property of an input signal received by another of the plurality of segments and carried on the corresponding one of the audio buses independent from input signals carried on other of the plurality of audio buses; and a mixer configured to combine the input signals carried on each of the plurality of audio buses into an output signal.

15 Claims, 10 Drawing Sheets

(56) References Cited

U.S. PATENT DOCUMENTS

| | | | | |
|---|---|---|---|---|
| 2002/0193894 | A1* | 12/2002 | Terada et al. | 700/94 |
| 2003/0121401 | A1 | 7/2003 | Ito | |
| 2004/0030425 | A1* | 2/2004 | Yeakel et al. | 700/94 |
| 2004/0208328 | A1 | 10/2004 | Strother | |
| 2004/0213412 | A1 | 10/2004 | Nishitani et al. | |
| 2006/0198540 | A1 | 9/2006 | Jonson | |
| 2007/0150082 | A1* | 6/2007 | Yang et al. | 700/94 |
| 2008/0080720 | A1* | 4/2008 | Jacob et al. | 381/103 |
| 2008/0175413 | A1 | 7/2008 | Okabayashi | |

FOREIGN PATENT DOCUMENTS

| | | |
|---|---|---|
| JP | 11-150783 | 6/1999 |
| JP | 2003-110384 | 4/2003 |
| JP | 2008-047970 | 2/2008 |
| JP | 2009-531808 | 9/2009 |
| WO | WO 2007/112421 | 10/2007 |

OTHER PUBLICATIONS

Cascio Interstatemusic, "PreSonus HP60 6 Channel Headphone Mixing System" http://www.interstaternusic.com/webapp/wes/stores/servlet/ProductDisplay?catalogId=10001&storeId=10051&productId=900192574&langId=I&parent_category_rn=20000 [retrieved May 4, 2009] (1 page).

Musician's Friend, "Behringer POWERPLAY PRO-XL HA 4700 Headphone Amp," http://pro-audio.musiciansfriend.com/product/Behringer-HA4700-Powerplay-Pro-Headphone-Amp?sku=240107&src=3SOSWXXA [retrieved May 4, 2009] (3 pages).

Rolls, "MX41 4 Channel Line Mixer—Owner's Manual," http://www.directproaudio.com/images/products/mx41man.pdf [retrieved May 4, 2009] (2 pages).

Rolls, "MX41b Four Channel Mixer—Owner's Manual" http://www.rolls.com/product.php?pid=MX41b [retrieved May 4, 2009] (1 page).

Rolls, "MX41b Four Channel Mixer—Manual" http://www.rolls.com/pdf/M_MX41b.pdf?PHPSESSID=3eb76a6571930d1bbff49d70215969c7 [retrieved May 4, 2009] (1 page).

Musician's Friend, "TASCAM DP-02CF Portastud (Mislabeled) Protastudio" http://pro-audio.musiciansfriend.com/product/Tascam-DP02CF-Digital-Portastudio-Recording-Studio?sku=241813 [retrieved May 4, 2009] (3 pages).

Musician's Friend, "Frontier Design Group AlphaTrack DAW Controller" http://pro-audio.musiciansfriend.com/product/Frontier-Design-Group-AlphaTrack?sku=700841 [retrieved May 4, 2009] (3 pages).

Hear Technologies, Holland, David. "Getting the Most Out of Personal Monitor and IEM Systems," http://www.heartechnologies.com/downloads/Hear_IEM_Personal_Monitor_article.pdf [retrieved May 4, 2009] (4 pages).

Hear Technologies, "Hear Back System," http://www.heartechnologies.com/hb/hearbacksystem.htm [retrieved May 4, 2009] (1 page).

Aviom.com, A-1611 Personal Mixer-Features http://www.aviom.com/Product-Categories-1/Mixers-1/A-1611-Personal-Mixer [May 4, 2009] (1 page).

Aviom.com, "A-1611 Personal Mixer-Details" http://www.aviom.com/Product-Categories-1/Mixers-1/A-1611-Personal-Mixer [May 4, 2009] (1 page).

Aviom.com, "Monitor Mixing-Overview" http://www.aviom.com/Applications-1/Monitor-Mixing.cfm?ref=homebutton [May 4, 2009] (1 page).

*Extended European Search Report*, European Application No. 09747619.6, mailed Nov. 3, 2011 (7 pages).

* cited by examiner

SYSTEMS FOR COMBINING INPUTS FROM ELECTRONIC MUSICAL INSTRUMENTS AND DEVICES

CROSS-REFERENCE TO RELATED APPLICATION PARAGRAPH

This application is a continuation of and claims the priority of U.S. application Ser. No. 12/466,311 filed on May 14, 2009, which claims the benefit of U.S. Provisional Application No. 61/053,391 filed on May 15, 2008, the contents of the applications are hereby incorporated by reference in their entirety.

FIELD OF THE INVENTION

The invention relates to systems for combining inputs from musical instruments (such as electronic and electro acoustic instruments) and similar devices.

BACKGROUND

Electric and electro-acoustic musical instruments, such as an electric guitar, an acoustic guitar with a pickup, an electric bass, and microphones rely on electronics, such as amplifiers, to amplify and/or modify their sound. In a setting with multiple musicians, such as a band rehearsal, each musician may have an amplifier, and the band as a whole may have mixers to control and monitor the output of the band as a whole. For instance, products such as the Rolls MX41 mixer or the Mackie 1202 accept multiple input channels, allow manipulation of each input, and generate one audio mix.

Often, it is desirable for a band rehearsal to be conducted “silently;” that is, to feed the band’s sound into headphones such that the instruments make minimal acoustic sound. Headphone amplifiers can enable silent rehearsals: these devices accept multiple inputs, combine the inputs into one output signal, and feed the output signal into headphones worn by each musician. However, headphone amplifiers do not allow each musician individual control over the constituent parts of a particular mix of inputs that feeds into his headphones. Rather, a common mix is generated by a separate piece of equipment (a “mixer”) and that same mix is directed into each musician’s headphones or other listening device. At most, some headphone amplifiers, manufactured for example by Samson and PreSonus, allow a musician to increase the volume of his own input channel (the “More Me” concept) within his own set of headphones. Even with headphone amplifiers, however, a common mix is still created prior to the headphone amplifier so that a change in the overall mix impacts all listeners; individual modifications to other input channels are not possible with headphone amplifiers and mixers used together.

SUMMARY

In one general aspect of the invention, an apparatus includes a plurality of audio buses and a plurality of segments. Each segment includes input circuitry configured to receive at least one input signal from at least one electric musical device and to deliver the at least one input signal to one of the plurality of audio buses; a plurality of variable adjustment devices each associated with a corresponding one of the audio buses and each configured to change at least one property of an input signal received by another of the plurality of segments and carried on the corresponding one of the audio buses independent from input signals carried on other of the plurality of audio buses; and a mixer configured to combine the input signals carried on each of the plurality of audio buses into an output signal.

Embodiments may include one or more of the following. The at least one property of the input signal includes the gain of the input signal. The input circuitry includes circuitry for adjusting at least one property, e.g., the gain, of the at least one input signal prior to delivering the at least one input signal to one of the plurality of audio buses. The input circuitry includes circuitry for adjusting the proportion of the at least one first input signal delivered to each of a first channel and a second channel of the first audio bus. The apparatus includes output circuitry configured to adjust the volume of the output signal and to deliver the output signal to an output device, e.g., a set of headphones or a digital recorder. The apparatus includes a phantom power switch. The plurality of audio buses and the plurality of segments are contained within a housing; for example, the plurality of channels are arranged radially within the housing. The housing is portable At least one of the segments is remotely operable. The apparatus includes a docking station.

In another aspect, the invention relates to a method for combining input signals produced by a plurality of electric musical devices. The method includes receiving a plurality of input signals into a corresponding plurality of segments; directing each input signal into an audio bus; and, for each segment, adjusting at least one property of each input signal independently from each other input signal and independently from each other channel and combining the plurality of input signals into an output signal.

Embodiments may include one or more of the following. The at least one property of the input signal includes the gain of the input signal. The method includes adjusting the gain of each input signal before directing each input signal into an audio bus. Directing each input signal into an audio bus includes adjusting the proportion of the input signal sent to each of a first channel and a second channel of the audio bus. The method includes adjusting the volume of the output signal and delivering the output signal to an output device, e.g., a set of headphones.

An apparatus including a plurality of audio buses and a plurality of segments has advantages for groups of musicians who need to rehearse together “silently,” making only minimal acoustic sound, for instance because the noise from a loud rehearsal would disturb neighbors. The apparatus allows each musician to control the combination of channels he or she hears independently of the combination heard by each other musician. This capability enables more productive rehearsals as each musician can generate a combination that best suits his or her musical needs or preferences. The operation of the apparatus is straightforward and can be done by the musicians themselves during the rehearsal or performance of a piece of music without the need for a sound engineer or technician. Furthermore, the apparatus may be connected to devices such as a digital music recorder or a computer, allowing the rehearsal to be recorded and allowing the combination of channels recorded to be adjusted. Currently available devices do not provide each musician with the capability of independently adjusting what he or she hears. The apparatus described above is also light and portable, allowing it to be used easily in a variety of locations, such as in rehearsal studios, homes, schools, dorm rooms, and performance venues.

DETAILED DESCRIPTION OF EMBODIMENTS

Figure 1:
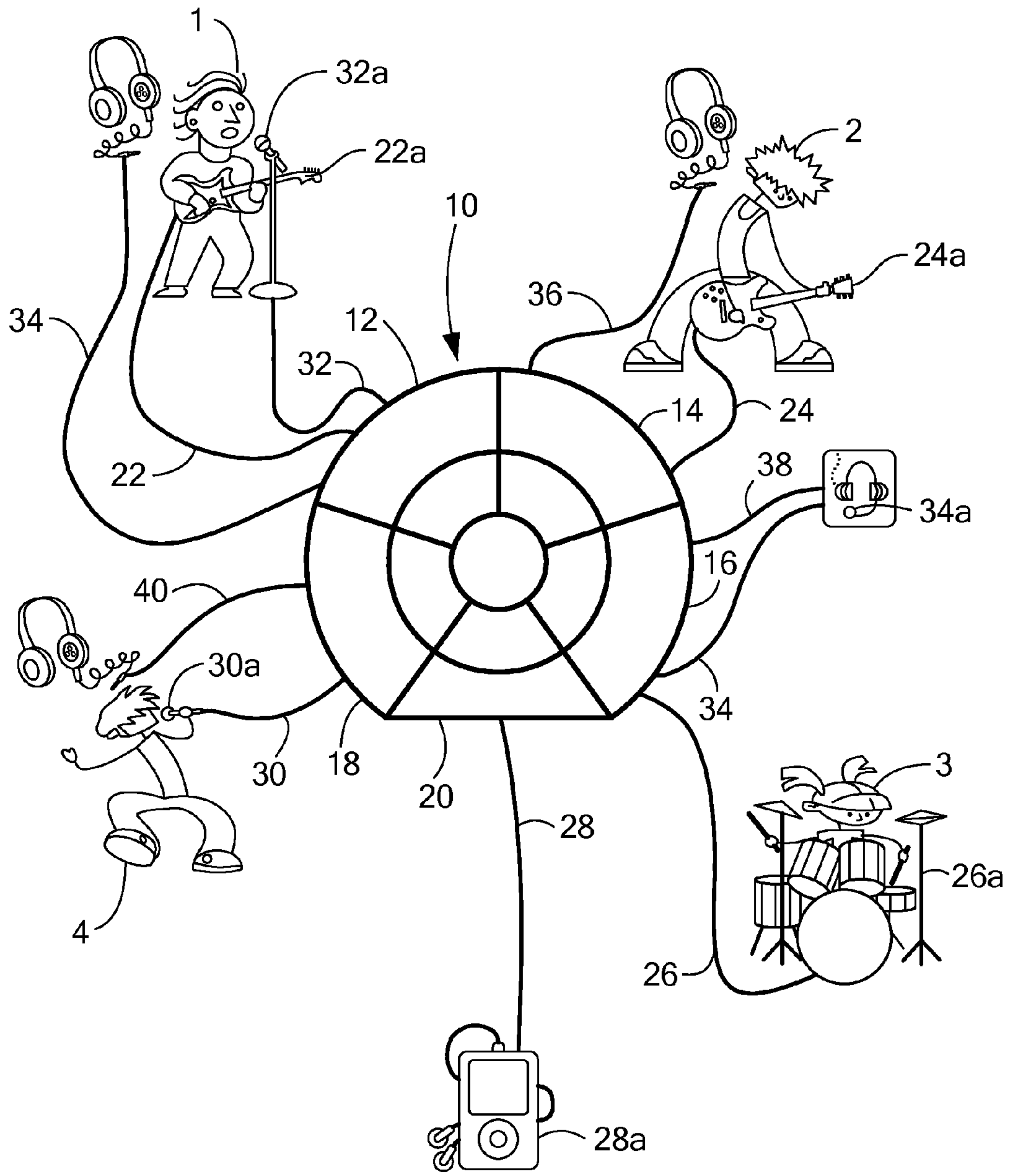
FIG. 1 is a cartoon depiction of a group rehearsal system.

Referring to FIG. 1, a group rehearsal system 10 is shown. The rehearsal system 10 allows musicians 1, 2, 3, and 4 to rehearse together silently, and enables each musician to control independently the "mix," or combination of instruments he or she hears. In this way, each musician can generate a unique mix that suits his or her needs or preferences without impacting the mix heard by the other musicians. Rehearsal system 10 is composed of multiple channels 12, 14, 16, 18, and 20 for receiving electronic musical signals or channels. In the example shown in FIG. 1, each channel accepts input 22, 24, 26, 28, or 30 from a different electronic musical device associated with the channel. Here, for example, inputs 22, 24, 26, 28, and 30 are associated with, respectively, an electric guitar 22*a*, a bass guitar 24*a*, an electronic drum kit 26*a*, an electronic music player 28*a*, and a microphone 30*a*. Other electronic musical devices, such as keyboards, may also be used. A channel may receive inputs from multiple devices; for example, channel 12 receives inputs 22 and 32 from an electric guitar 22*a* and a microphone 32*a*. As described in greater detail below, each channel generates a mix of the inputs received by all the channels 12, 14, 16, 18, and 20. Within each channel, the volume of the input to the channel and of the inputs to each other channel can be adjusted independently to generate a unique mix of inputs in each channel. The overall volume of the mix may also be controlled. In some embodiments, other properties of each input, such as reverberation and pan effects, may also be adjusted. The mix of inputs in each channel constitutes an output signal 34, 36, 38, or 40 that is delivered to an output device associated with the channel. For example, an output device may be a set of headphones, a computer, a digital recorder, an ear monitor, or a speaker. In some embodiments, rehearsal system 10 may have more or less than five channels.

Figure 2:
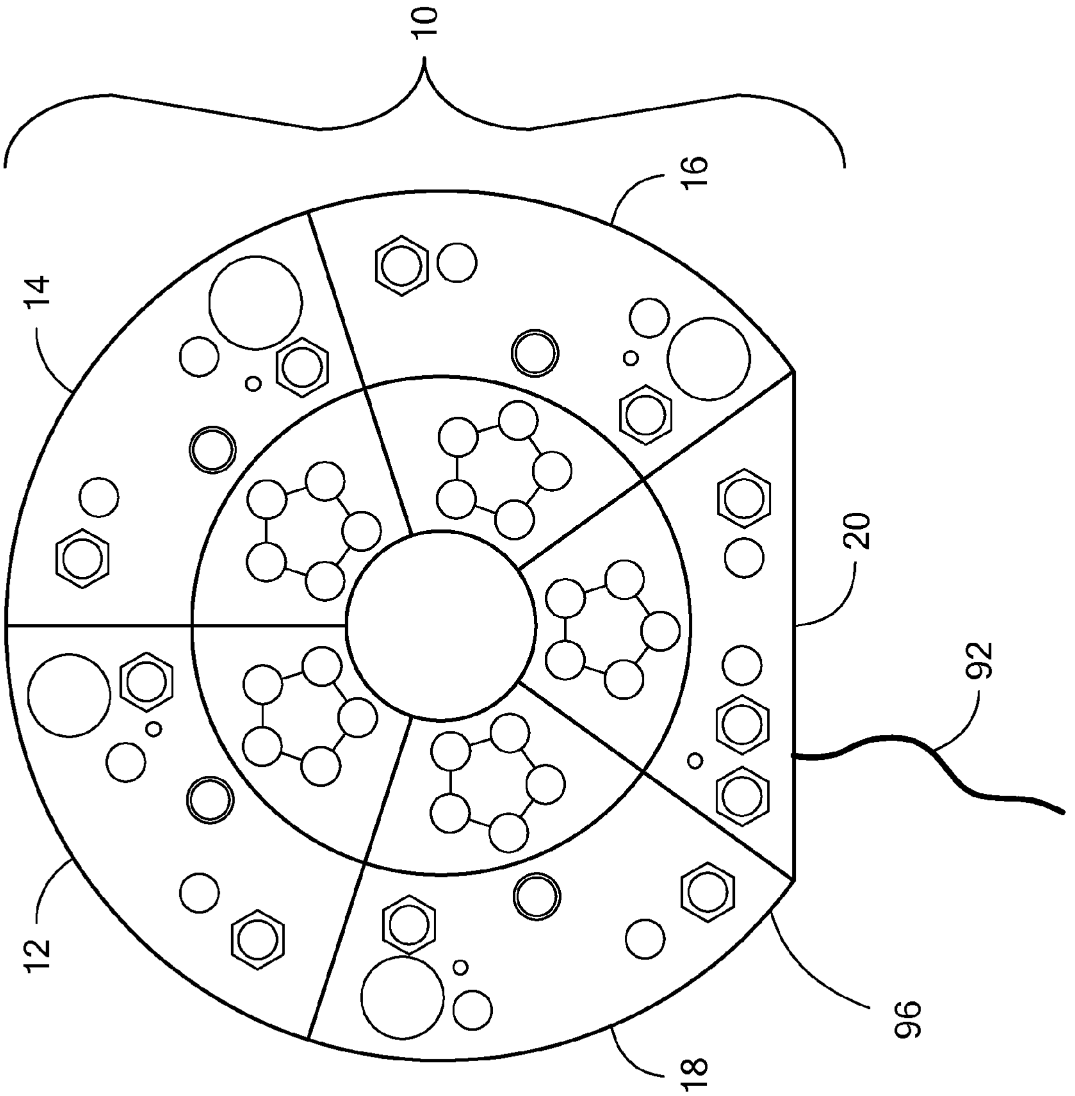
FIGS. 2 and 2A are schematics of the external structure of the rehearsal system.
Figure 2A:
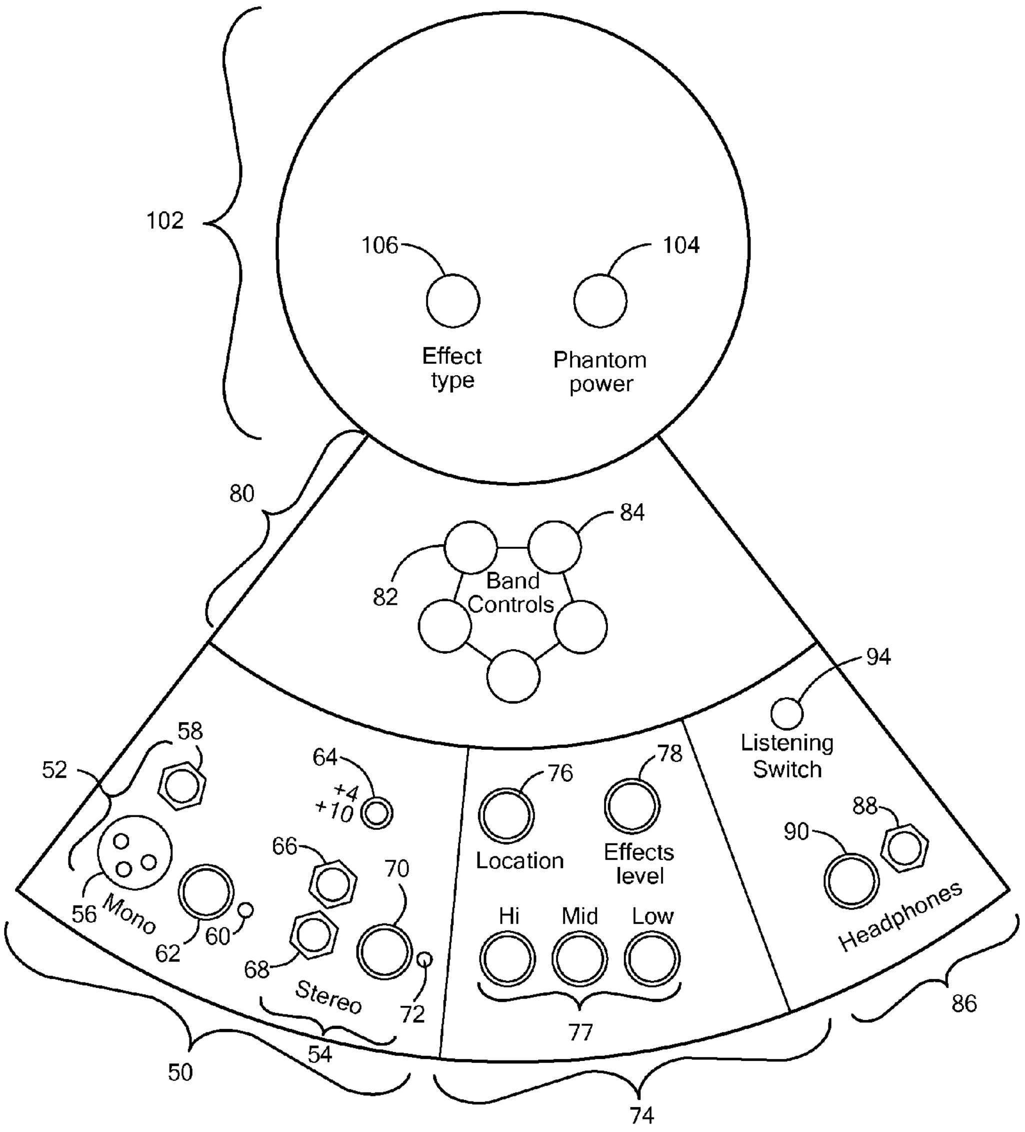

Referring to FIGS. 2 and 2A, channels 12, 14, 16, 18, and 20 are arranged radially within rehearsal system 10. Rehearsal system 10 is connected to a power supply 92. Each channel contains an input section 50, a channel control section 74, a band control section 80, and an output section 86. Rehearsal system 10 also contains a global controls section 102.

Referring to FIG. 2*a*, an exploded view of the layout of one channel is shown. Input section 50 may contain one or more mono input channels 52 and one or more stereo input channels 54, or may contain only one mono input channel or one stereo input channel. Mono input channel 52 contains a first mono input 56 and a second mono input 58. First mono input 56 is an XLR input for a microphone, and requires a preamp and a trim control 62 to set the gain. An LED 60 associated with mono inputs 56 and 58 illuminates green when an input signal is detected above a minimum threshold, yellow when the gain level of the input signal approaches preamp clipping (e.g., when the input signal is 10 dB below clipping), and red when the gain level of the input signal reaches preamp clipping. LED 60 may be replaced with an LCD screen to communicate information about the gain level of the input signal. Second mono input 58 is a ¼" TRS jack designed to accept TR and TRS cables. Second mono input 58 accepts input from electronic musical instruments such as an acoustic guitar, an electric guitar amp modeler, a keyboard, a bass guitar, a bass guitar amp modeler, a piezoelectric pickup, or electronic drums. Second mono input 58 may have a trim control and an LED light (not shown) similar to LED 60 associated with first mono input 56. Second mono input 58 may also have a high impedance switch (not shown) to improve impedance matching of direct input (i.e., input without a preamp) from an acoustic guitar or a bass guitar. Stereo input channel 54 has two stereo inputs 66 and 68, which are TRS jacks that accept balanced or unbalanced inputs. In another embodiment, a single stereo TRS jack is used. Stereo input 66 is wired to act as a mono input if needed. Stereo input channel 54 also has a gain control 70 and an LED 72 with an operation similar to that of LED 60. A +4 dbu −10 dbV switch 64 may be incorporated on stereo input channel 54 to allow for varying the nominal (RMS) input voltage of the channel. A similar +4 dbu −10 dbV switch may also be incorporated on mono input channel 52.

Channel control section 74 contains a location control 76 that controls the distribution of input signal between a right and a left channel of the output signal in order to create a pan effect. Channel control section 74 also contains an effects level control 78 for adjusting the levels of the input signal of the channel. For instance, effects level control 78 may adjust the degree of reverberation effects applied to the channel. The channel control may have other controls to affect the input signal of the channel, including equalization controls 77, an effects type select and level control (not shown), a 75 Hz "high pass" EQ switch (not shown), and other controls.

Band control section 80 contains five controls for adjusting the level of the mono input channels and stereo input channels of each channel 12, 14, 16, 18, and 20 of rehearsal system 10. For instance, if the exploded section of FIG. 2A shows the layout of channel 12, control 82 adjusts the level of the mono and stereo inputs of channel 14, and control 84 adjusts the level of the mono and stereo inputs of channel 16. In general, the number of controls in band control section 80 corresponds to the number of channels of rehearsal system 10. In cases such as that as shown here where a stereo and a mono channel are combined into one channel, control 80 may adjust the level of both the mono and the stereo input via one control, two controls (one for the stereo input and one for the mono input), or a device with two concentric controls.

Output section 86 contains a ¼" output jack 88 for connecting the mix to an output device and a gain level knob 90 for adjusting the gain of the output. In other embodiments, the output jack may be a ⅛" TRS, RCA, USB, mini-DIN structure, or other type of connector.

Global controls section 102 contains controls that affect all channels equally. A phantom power switch 104 provides 48 V DC power to all mono inputs to power condenser microphones, Direct Input boxes, and devices requiring phantom power. An effects control 106 determines the types of effects, such as reverberation, used by the channels.

Figure 3:
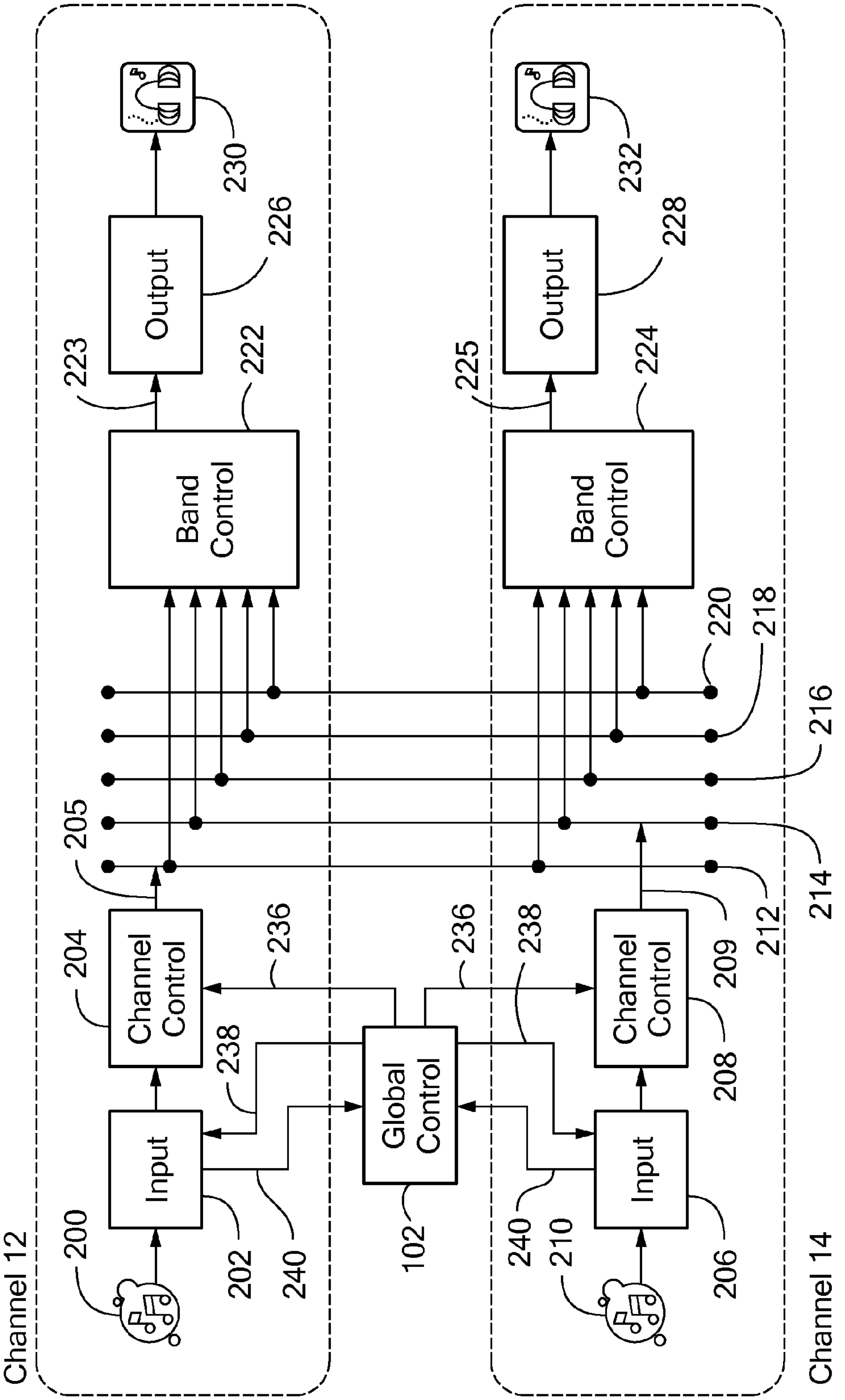
FIG. 3 is a block diagram representation of the rehearsal system.

Referring to FIG. 3, the main functional components of rehearsal system 10 are shown for channels 12 and 14. Other channels 16, 18, and 20 have similar functional components. In channel 12, an audio electrical input signal 200 enters an input section 202; in channel 14, an audio electrical input signal 210 enters an input section 206. The input signals may be provided by a variety of devices including a musical instrument, a microphone, or a digital music player; each input section may accept input signals from multiple devices simultaneously. Input sections 202 and 206 allow a user to set the level of the input signal 200, 210 to a level that is optimal for the particular input device.

Each of the input signals 200, 210 passes to a channel control section 204, 208 in channels 12 and 14, respectively. The channel control section 204, 208 generates a modified signal 205, 209, respectively, by applying pan control, reverberation, equalization and other effects. Modified signals 205, 209 may be identical to input signals 200, 210 if a user does not desire modification. The modified signal 205, 209 is delivered to an audio bus 212, 214, respectively. Similarly, audio buses 216, 218, 220 receive modified signals from channels 16, 18, and 20.

The modified signals carried by each audio bus 212, 214, 216, 218, and 220 enter a band control section 222, 224 in channels 12 and 14, respectively. Band control section 222 creates an individual mix 223 for channel 12 by providing control over the level of signal from each audio bus 212, 214, 216, 218, and 220 contained in mix 223. For example, band control section may set the level of the signal from audio bus 212 at 100%, the level of the signal from audio bus 214 at 75%, and the level of the signals from audio buses 216, 218, and 220 at 50%. Likewise, band control section 224 creates an individual mix 225 for channel 14. The levels of the signals from audio buses 212, 214, 216, 218, and 220 may be different in mix 225 than they are in mix 223. Similarly, channels 16, 18, and 20 also have band control sections that create individual mixes of the signals in audio buses 212, 214, 216, 218, and 220.

Signals representative of mixes 223 and 225 generated in band control sections 222 and 224 are directed into output sections 226 and 228, respectively. Each output section contains controls to adjust the level of an output signal. For example, a user listening to channel 12 through a set of headphones 230 can hear mix 223 and can vary the overall level of mix 223 using the controls in output section 226. Similarly, a user listening to channel 14 through a set of headphones 232 can hear and control mix 225. Each output section also contains various types of external connections, such as a ¼" TRS jack, a ⅛" TRS jack, and a USB port for connection to output devices such as set of headphones, a computer, a digital recorder, an ear monitor, or speakers.

In some embodiments of rehearsal system 10, a global controls section 102 is integrated into two or more channels. In this example, global controls section 102 is connected only to channels 12 and 14; in other embodiments, global controls section 102 may be connected to some or all of channels 12, 14, 16, 18, and 20. Global controls section 102 provides effects such as reverberation to input signals 200, 210 and provides non-audio functions such as 48 V phantom power 238. The input signal 200, 210 from each channel 12, 14 is sent to global controls section 102, where a given effect is applied to the signal. Each signal is then directed 236 to the channel control section 204, 206 corresponding to its channel of origin, where the level of the signal can be adjusted as described above. In general, effects processors may allow control over all channels equally, such as through global controls section 102, or through each individual channel, such as through channel control sections 204 and 206.

Figure 4:
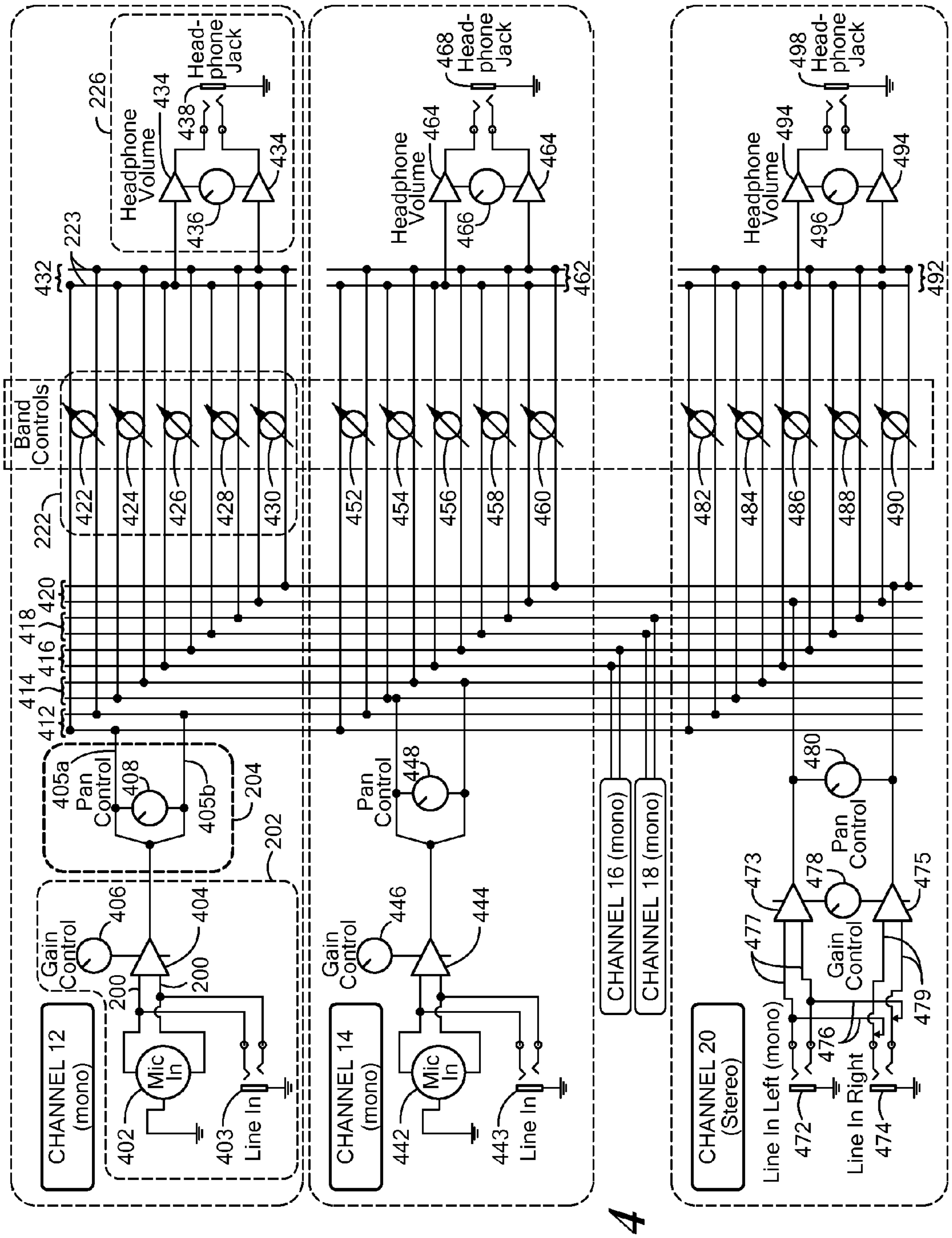
FIG. 4 is a schematic of the electronic circuitry of the rehearsal system.

Referring to FIG. 4, a schematic of the circuitry of rehearsal system 10 is shown for channels 12, 14, and 20. Channels 12 and 14 (and channels 16 and 18, details of which are not shown for clarity) have mono input channels and have equivalent circuit structure; channel 20 has a stereo input channel. In channel 12, input section 202 contains an XLR input 402 connected by a ¼" TRS jack 403. Input signal 200 passes to a preamp 404 controlled by a gain control 406. In this embodiment, a pan control 410 in channel control section 204 sets the amount of signal 205*a*, 205*b* sent to the left and right sides, respectively, of audio bus 212. Other audio buses 214, 216, 218, and 220 carry signals from channels 14, 16, 18, and 20, respectively. The signals carried by the audio buses enter band control section 222 of channel 12. In band control section 222, a control 422, such as a potentiometer or an encoder, adjusts the amount of signal from audio bus 212 that will be contained in mix 223; similarly, controls 424, 426, 428, and 430 adjust the amount of signal from audio buses 214, 216, 218, and 220, respectively, that will be contained in mix 223 of channel 12. The adjusted signals are combined into mix 223 on a single output bus 432. Output bus 432 sends mix 223 to output section 226, where an amplifier 434 controlled by a control 436 adjusts the level of the mix sent to an output connector 438, for instance, a headphone jack. Channels 14, 16, and 18 have an equivalent circuit structure to that of channel 12; in particular, each channel has a unique output bus that allows the mix of each channel to be independent from the mix of each other channel. Channel 20 has a stereo channel that contains two TRS inputs 472 and 474 to accept an input signal. Circuit elements 476 allow input 472 to function as a mono input when no device is connected to input 474. An input gain control 478 controls amplifiers 473 and 475 to amplify the input signal on both a left 477 and a right 479 channel simultaneously. The signal is then adjusted by a pan control 480, and arrives at audio bus 220. The subsequent circuit structure of channel 20 is equivalent to that described above for channel 12.

Other features of rehearsal system 10 are as follows. Input section 50 may contain a built-in drum machine (or MIDI sequencer) with its own channel control section 74 and a dedicated audio bus. Each channel 12, 14, 16, 18, and 20 may then have a control in the band control section 80 for controlling signal on the drum machine's audio bus. Likewise, a band control section may be connected to a built-in multi-channel audio recording device in its output section 86 to enable recording of a performance or rehearsal. Electric and bass guitar amplifier modeling capabilities or a MIDI sound module for electronic drums or keyboards may be incorporated into channel control section 74. A guitar tuner may be included in one or more channel control sections 74 or in global controls section 102. A cabled or wireless remote control could be used to allow, for example, drummers who are seated far from rehearsal system 10 to access controls of their channel remotely. A gain boost control and foot switch could be included in channel control section 74 to temporarily increase the output of a given channel's signal, for example to allow for a change in volume for a solo. Rehearsal system 10 could include a power distribution system separate from audio circuitry so that devices requiring AC power could use rehearsal system 10 as a power source.

Figure 5:
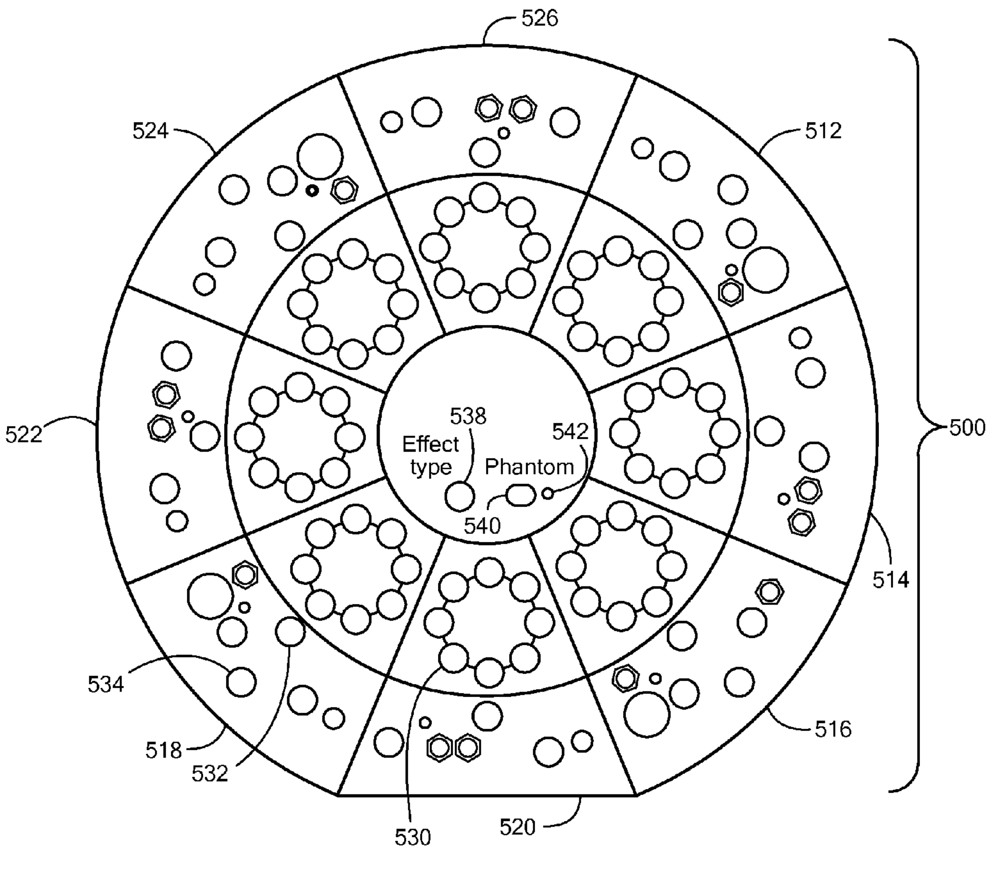
FIG. 5 is a schematic of another embodiment of the rehearsal system.

Referring to FIG. 5, an alternative embodiment of a rehearsal system 500 has eight channels 512, 514, 516, 518, 520, 522, 524, and 526. A global effects processor has an effects control 538 that controls effects applied to signals from all channels and a power control 540 to provide phantom power either to all channels or to only channels with an XLR jack. An LED 542 illuminates when phantom power is provided. Channels 512, 516, 518, and 524 have mono input sections and channels 514, 520, 522, and 526 have stereo input sections and mono input sections. Each channel has an input section, a channel control section, a band control section, and an output section. The band control section has eight controls 530 for adjusting the level of signal received from each channel, allowing a unique mix to be generated in each channel. Each channel also contains effects controls such as a pan control 532 and a levels control 534, which adjusts the level of that channel's signal once returned from the global effects processor.

Figure 6:
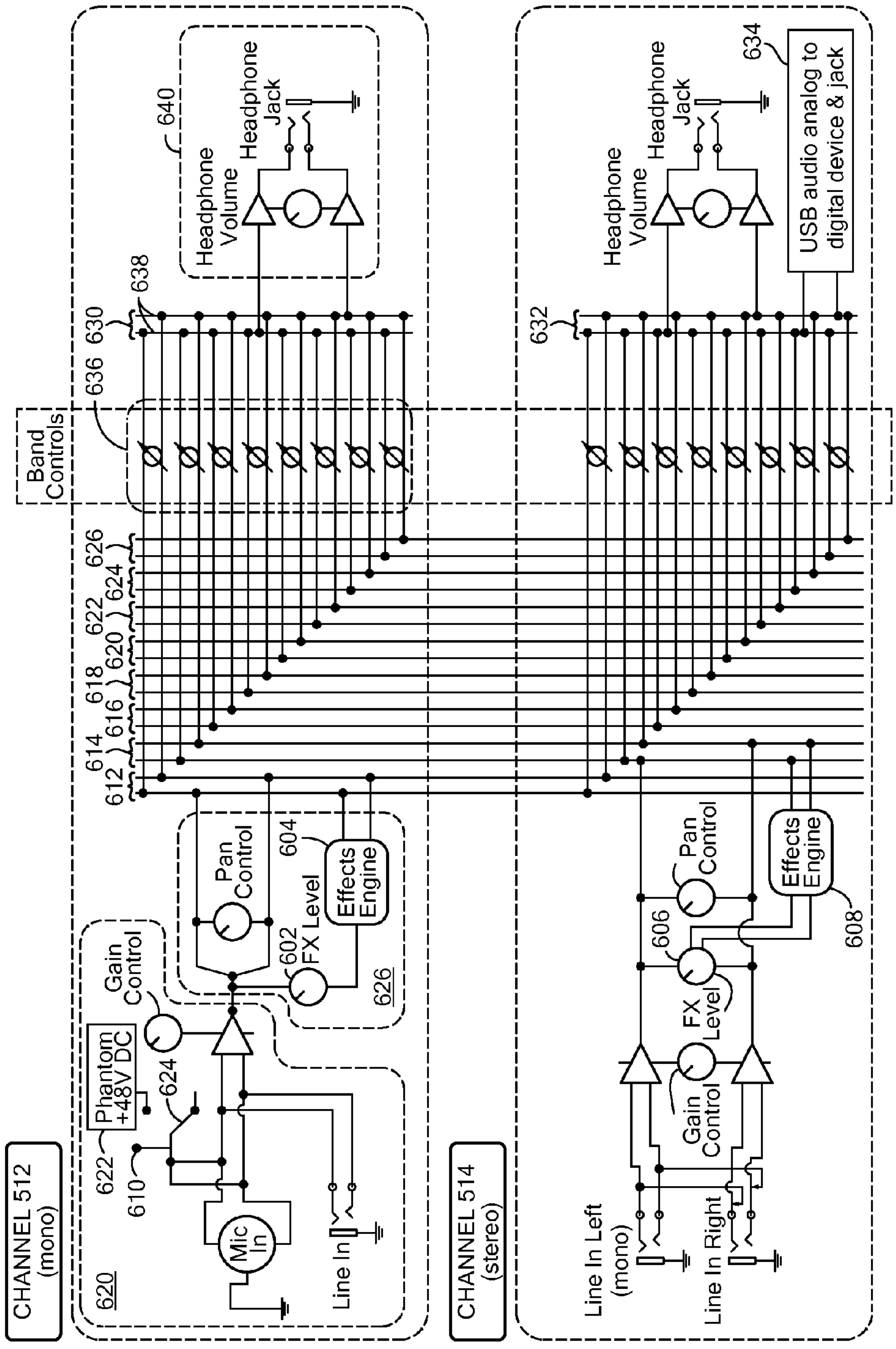
FIG. 6 is a schematic of the electronic circuitry of the rehearsal system shown in FIG. 5.

Referring to FIG. 6, a schematic of the circuitry of rehearsal system 500 is shown for representative channel 512 and representative channel 514. Other channels 516, 518, and 524 have a circuit structure equivalent to that of channel 512; other channels 520, 522, and 526 have a circuit structure equivalent to that of channel 514. Many elements of the circuitry of rehearsal system 500 correspond to elements of rehearsal system 10 shown in FIG. 4. In channel 512, an input section 620 includes a 48 V DC phantom power circuit 622, a switch 624 for turning the phantom power on and off, and an LED 610. A channel control section 626 contains an effects level control 602 which sends an input signal to an effects processor 604. The signal exits channel control section 626 and is sent to an audio bus 612. Rehearsal system 500 contains eight audio buses 612, 614, 616, 618, 620, 622, 624 and 626, each receiving signal from channels 512, 514, 516, 518, 520, 522, 524 and 526, respectively. A band control section 636 of channel 512 determines the level of signal from each audio bus included in a mix 638 on an output bus 630. Output bus 630 sends mix 638 to an output section 640. Each channel has a separate output bus such that a unique mix of signals can be generated for each channel independent of each other channel. Channel 514 also contains a control 606 that sends an input signal to an effects processor 608. Channel 514 is depicted with an optional second output 634, which in this case is a USB audio analog-to-digital device to allow direct-to-computer recording.

In the rehearsal systems described herein, the channels are embodied as segments of a main body of the rehearsal system. For instance, referring again to FIG. 2, channels 12, 14, 16, 18, and 20 each constitute a segment of a main body 96 of rehearsal system 10.

Figure 7:
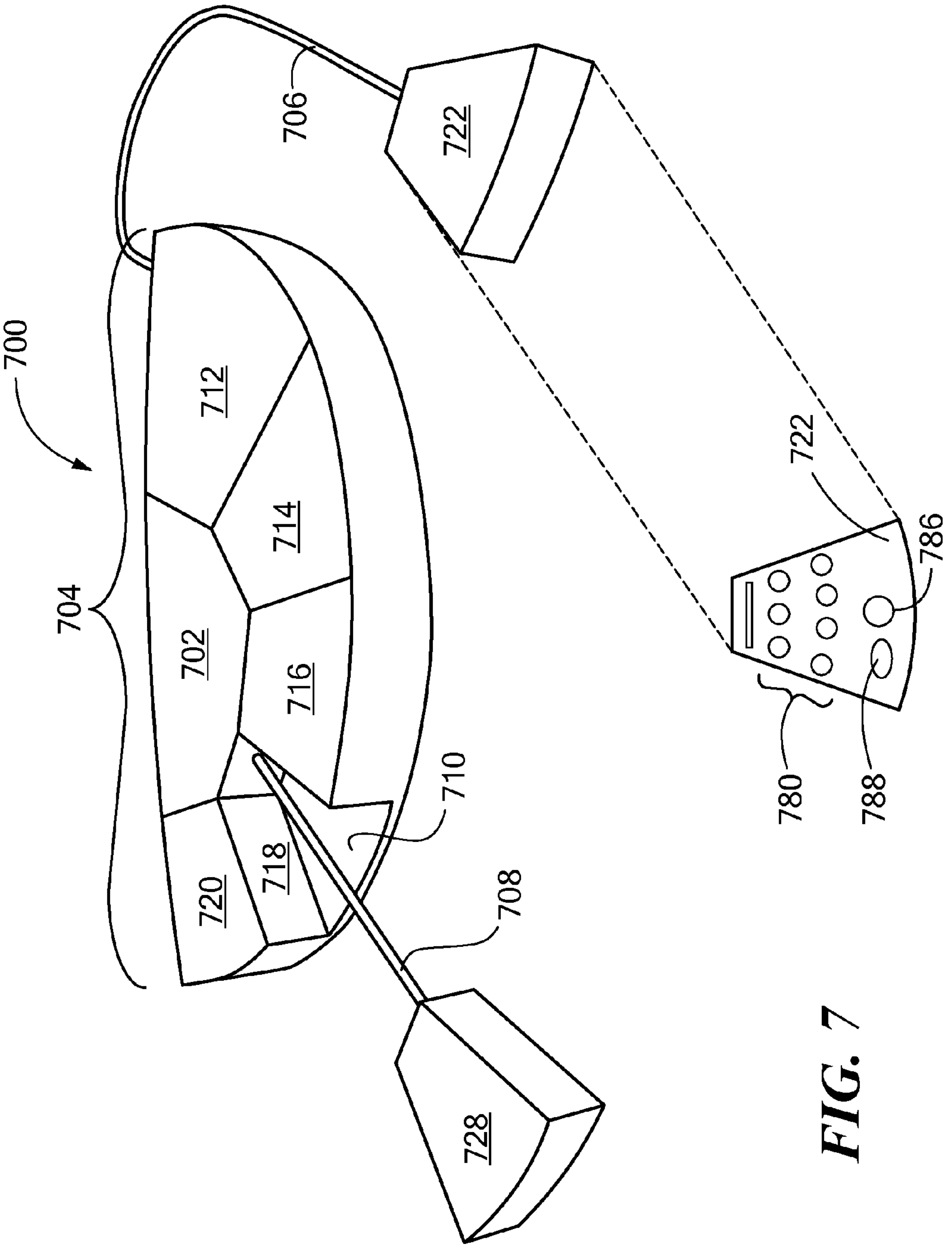
FIG. 7 is a schematic of an embodiment of the rehearsal system in which one or more channels are remotely operable using a remote control.

Referring to FIG. 7, in one embodiment of a rehearsal system 700, one or more of channels 712, 714, 716, 718, and 720 are remotely operable using a remote control. When multiple remote controls are used, each remote control is associated with one channel. In the example shown, channels 712 and 718 are controlled by remote controls 722 and 728, respectively, and channels 714, 716, and 720 are not remotely operable. In other embodiments, other combinations of channels are controlled by remote control. Channel 712 is controlled by remote control 722 which is physically separate from a main body 704 of the rehearsal system 700 and connected to main body 704 via a wired connection 706. Channel 718 is controlled by remote control 728 which is removable from the main body 704 and which docks into a space 710 in main body 704 where channel 718 would be located. Remote control 728 is also connected to main body 704 via a wired connection 708. In another embodiment, remote controls 722 and 728 are wirelessly connected to main body 704. Remote controls 722 and 728 manage the functions of any or all of the input section, channel control section, band control section, and output section of channels 712 and 718, respectively. For instance, in the embodiment shown in FIG. 7, remote control 722 includes band control knobs 780, an output knob 786, and an effects return knob 788 that allow for the remote operation of channel 712. Band control knob 780 contain controls for adjusting the level of the input channels of each channel 714, 716, 718, and 720 of rehearsal system 700. Output knob 786 controls the volume of an output signal sent to an output device, such as headphones. Effects return knob 788 adjusts the levels of the input signal to channel 712. In some embodiments, at least one of remote controls 722 and 728 also manages the functions of a global controls section 702. In some examples, electronic musical devices are connected directly into rehearsal system 700. In other examples, electronic musical devices, such as a drum set or a microphone, are connected into a remote control (e.g., remote control 722 or 728) instead of into rehearsal system 700.

Figure 8A:
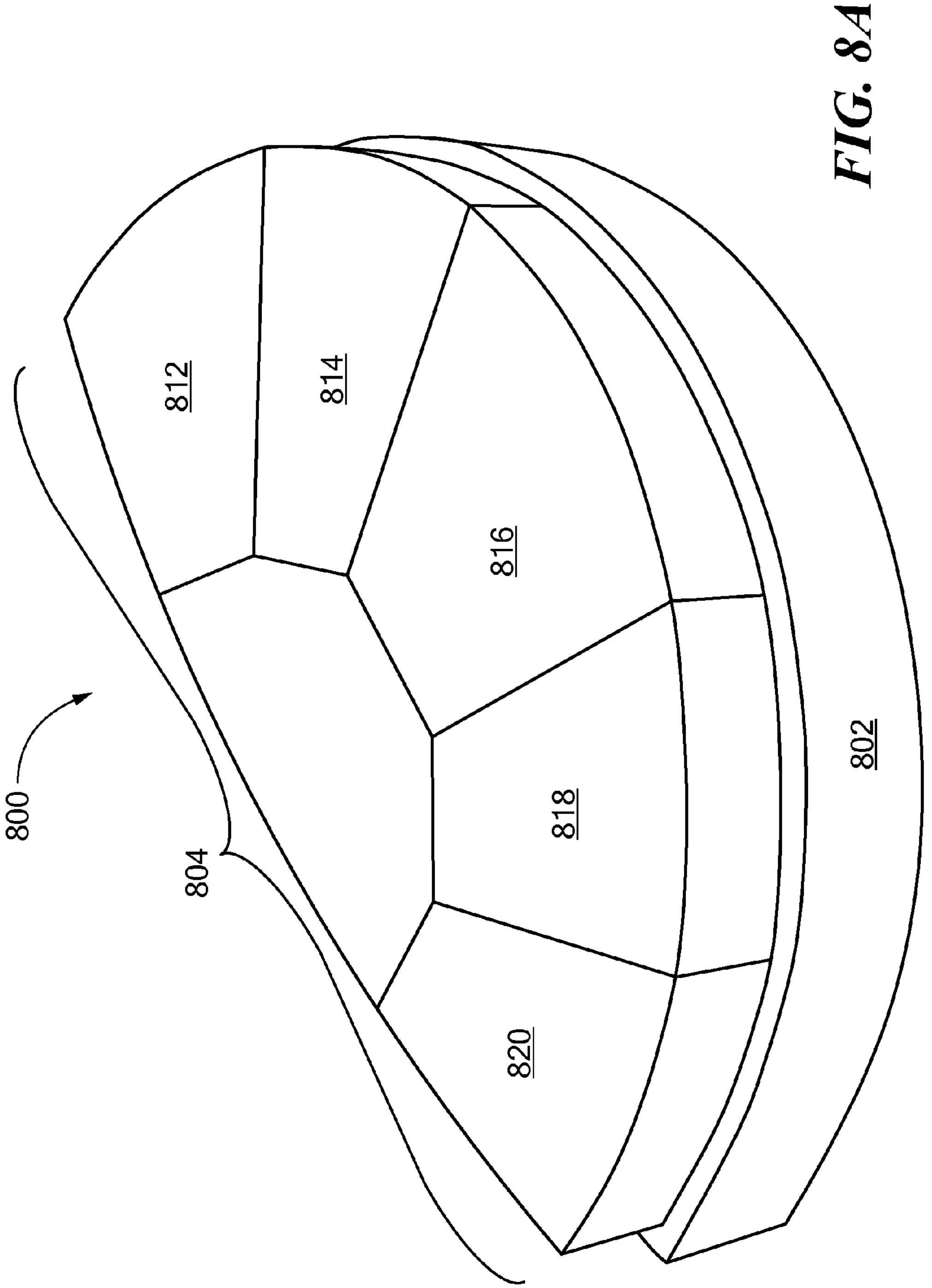
FIG. 8A is a schematic of an embodiment of the rehearsal system including a docking station.
Figure 8B:
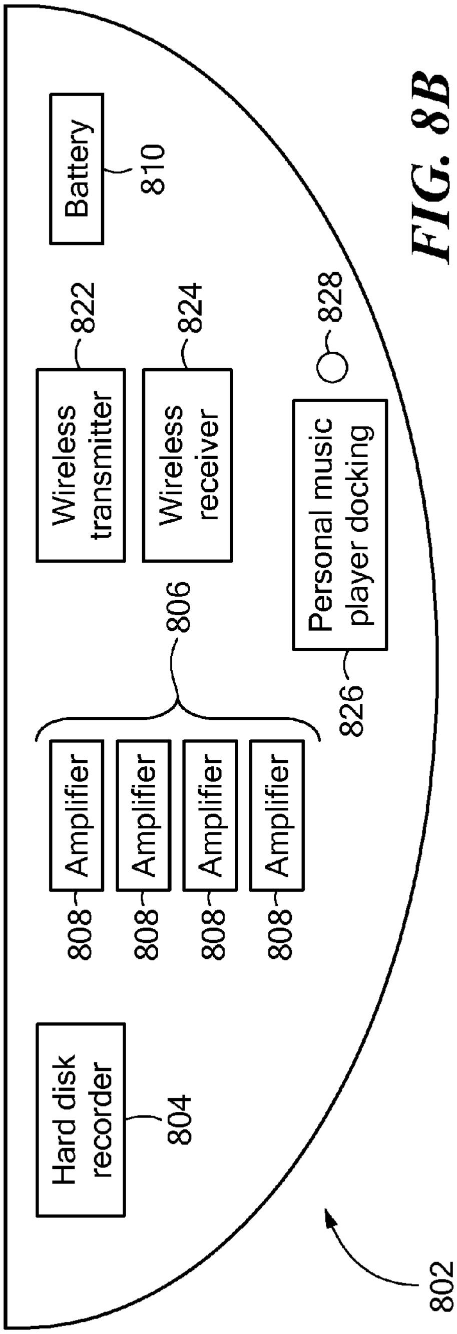
FIG. 8B is a block diagram representation of features of the docking station.

Referring to FIG. 8A, in one embodiment, a main body 804 of a rehearsal system 800 is docked to a docking station 802, which includes one or more devices that add additional functionality to the basic capabilities of rehearsal system 800. Docking station 802 is a "direct out" dock which includes connectors (not shown) that allow each channel 812, 814, 816, 818, and 820 of rehearsal system 800 to send its output mix directly to the docking station. Referring to FIG. 8B, a hard disk recorder 804 included in docking station 802 provides the ability to record or play back audio recordings through rehearsal system 800. An array 806 of amplifiers 808 in docking station 802 supplies the ability to drive speakers for a live performance using rehearsal system 800. A rechargeable battery docking station 810 enables rehearsal system 800 to function without power from an AC outlet. A wireless transmitter 822 and receiver 824 included in docking station 800 control transmitters and receivers associated with channels 812, 814, 816, 818, and 820 of rehearsal system 800, enabling the wireless use of instruments, headphones, microphones, or other electronic musical devices. A personal music player docking station 826 and connector 828 enables rehearsal system 800 to interface with a personal music player, such as an iPod® or an mp3 player, enabling recording, playback of backing tracks, and other communication with an operating system of the personal music player.

Referring again to FIG. 2A, a further feature of the rehearsal system 10 is a recording output listening switch 94 that allows a musician to audit the output of a channel, such as the channel used for recording. Using the recording output listening switch 94, the musician can quickly switch from listening to the mix in his or her channel to listening to the mix in the channel used for recording. For instance, if FIG. 2A shows channel 12, then recording output listening switch 94 allows the musician using channel 12 to listen to the output of, e.g., channel 16. The recording output listening switch 94 is positioned on or near at least one of channels 12, 14, 16, 18, or 20 of rehearsal system 10.

Figure 9:
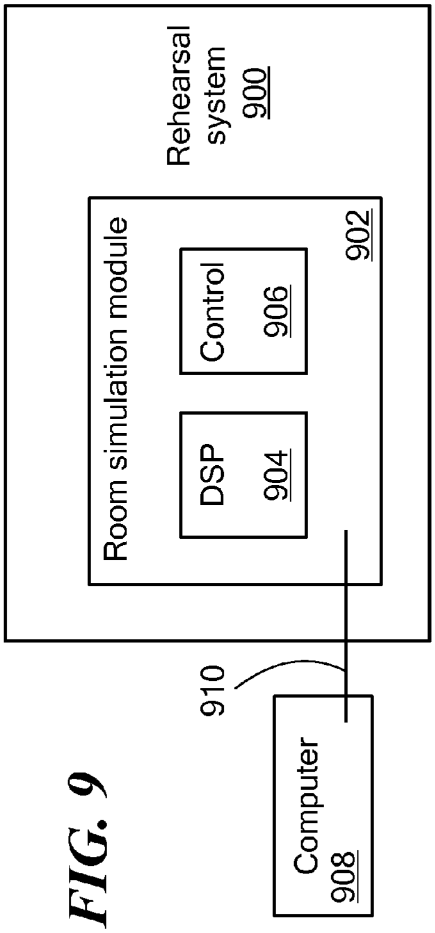
FIG. 9 is a block diagram representation of a rehearsal system including a room simulation module.

Referring to FIG. 9, in one embodiment, a rehearsal system 900 includes a room simulation module 902 that simulates a 'virtual room;' that is, the room simulation module generates the sound effects associated with playing music in a particular location. In one example, the room simulation module allows musicians to change the virtual room from a small room to a large room. In another example, the room simulation module allows musicians to select an audio response copy of a famous performance space, such as Abbey Road Studios in London or the stage at Buddy Guy's Legends club in Chicago. The room simulation module 902 generates sound effects of a particular room performance space via a digital signal processor 904 and a control mechanism 906, such as a knob or a touch screen LCD. The digital signal processor is preprogrammed with sound parameters of various types of rooms and performance spaces, such as how sound bounces around the room or performance space. To generate an output sound associated with playing music in a particular location, room simulation module 902 applies sound effects to signals in rehearsal system 900 based on the preprogrammed sound parameters. In one embodiment, a user of rehearsal system 900 creates a virtual room using a computer 908 and sends the virtual room to room simulation module 902 via a connector 910. Room simulation module 902 determines sound parameters of the virtual room and generates sound effects associated with playing music in that virtual room. In this embodiment, it is possible to generate sound effects that are not possible in the physical world.

In another embodiment, using audio feedback and data logging, the rehearsal system provides user feedback to musicians using the rehearsal system, for instance to help the musicians improve their playing. Algorithms track, log, and report to the musicians the degree of coupling of the musicians or the consistency in beats per minute of a drummer. In one example, in response to a performance that satisfies a selected threshold of consistency, audio feedback is provided in the form of a tone meaning “good” or the sound of applause from an audience.

It is to be understood that the foregoing description is intended to illustrate and not to limit the scope of the invention, which is defined by the scope of the appended claims. Other embodiments are within the scope of the following claims.

What is claimed is:

1. An apparatus comprising: a plurality of audio buses; and a plurality of segments, each segment including input circuitry configured to receive at least one input signal from at least one electric musical device and to deliver the at least one input signal to one of the plurality of audio buses; wherein each segment includes a plurality of variable adjustment devices each associated with a corresponding one of the audio buses and each configured to change at least one property of an input signal received by each of the plurality of segments respectively and carried on the corresponding one of the audio buses independent from input signals having the at least one changed property carried on other of the plurality of audio buses; and a mixer configured to combine the input signals carried on each of the plurality of audio buses into an output signal.

2. The apparatus of claim 1, wherein the at least one property of the input signal includes gain of the input signal.

3. The apparatus of claim 1, wherein the at least one property of the input signal includes a reverberation of the input signal.

4. The apparatus of claim 1, wherein the at least one property of the input signal includes a pan of the input signal.

5. The apparatus of claim 1, wherein the input circuitry includes circuitry for adjusting at least one property of the at least one input signal prior to delivering the at least one input signal to one of the plurality of audio buses.

6. The apparatus of claim 1, wherein the input circuitry includes circuitry for adjusting a proportion of the at least one input signal delivered to each of a first channel and a second channel of a first audio bus from the plurality of audio buses.

7. The apparatus of claim 1, wherein at least one of the segments is remotely operable.

8. The apparatus of claim 1, further comprising a phantom power switch.

9. The apparatus of claim 1, wherein the plurality of audio buses and the plurality of segments are contained within a housing.

10. The apparatus of claim 9, wherein the housing is portable.

11. The apparatus of claim 9, wherein the plurality of segments are arranged radially within the housing.

12. The apparatus of claim 1, further comprising a docking station.

13. An apparatus for combining inputs from electronic musical instruments, said apparatus comprising a first segment for receiving an input from a first electronic musical instrument, a second segment for receiving an input from a second electronic musical instrument, a first audio bus for receiving a first signal from said first segment, a second audio bus for receiving a second signal from said second segment, wherein each of said first segment and second segment include a first variable adjustment device connected to said first audio bus for changing a property of said first signal on said first audio bus, a second variable adjustment device connected to said second audio bus for changing a property of said second signal on said second audio bus, wherein each variable adjustment device operates independently of the other variable adjustment devices, and a first mixer for receiving a first output signal from said first variable adjustment device and a second output signal from said second variable adjustment device, and generating a first audio output signal at least in part by mixing said first output signal and said second output signal.

14. The apparatus of claim 13, further comprising a third variable adjustment device connected to said first audio bus for changing a property of said first signal on said first audio bus, and a fourth variable adjustment device connected to said second audio bus for changing a property of said second signal on said second audio bus, wherein said fourth variable adjustment device operates independently of said third variable adjustment device, wherein said fourth variable adjustment device operates independently of said second variable adjustment device, and wherein said fourth variable adjustment device operates independently of said first variable adjustment device.

15. The apparatus of claim 14, further comprising a second mixer for receiving a third output signal from said third variable adjustment device and a fourth output signal from said fourth variable adjustment device, and generating a second audio output signal at least in part by mixing said third output signal and said fourth output signal.

* * * * *